Oct. 8, 1968   J. EMAIN   3,404,491
STONE-CARRYING ELEMENTS OF GEM WORKING MACHINES
Filed Dec. 28, 1965   2 Sheets-Sheet 1

2,404,491
Patented Oct. 8, 1968

3,404,491
**STONE-CARRYING ELEMENTS OF GEM
WORKING MACHINES**
Jean Emain, 14 Rue Auguste-Lancon,
Saint-Claude, Jura, France
Filed Dec. 28, 1965, Ser. No. 516,948
Claims priority, application France, Jan. 5, 1965, 811
5 Claims. (Cl. 51—229)

ABSTRACT OF THE DISCLOSURE

A gem working machine having a plurality of parallel stone-carrying spindles mounted on a frame, one end of each spindle carrying a stone to be worked and the other end being rotated by a driving means. Each spindle consisting of a supporting element for the stone to be worked and a driving element, each element of each spindle having at one of its ends a single flattened portion retained against the flattened portion of the other element without play by an elastic retaining element. The spindle element carrying the stone rests on a removable support, mounted on the frame between the stone to be worked and the elastic assembly element.

---

The invention relates to improvements to the stone-carrying elements of gem working machines, such as cutters and polishers.

Stone-carrying elements are known which have spindles rotated by a nut engaging with a tangent wheel keyed to each of the spindles. The value of the angular rotation of each spindle is determined by $1/n$ of a rotation or $n$ rotations of the nut, to which indexing wheel is keyed for accurate indexing.

The spindles of these prior art stone-carrying elements are formed by two elements—i.e., one element to which the stone to be cut is cemented and a driving element which bears the tangent wheel engaging with the nut. The two elements are attached to one another, being connected together by a countersunk assembly of the mortice and tenon kind.

Soon after these stone-carrying elements have started to be used, their various driving elements develop play therebetween, thereby preventing a satisfactory constant angular relationship between the spindles and making it difficult for each facet to be dealt with during the polishing operation.

To obviate this disadvantage, each spindle is according to the present invention is made up of two elements, comprises a member which assembles the elements together without play and has a certain degree of resilience, such member being more particularly a resilient sleeve, the spindle element carrying the stone to be cut bearing against a resilient supporting member during the operation of polishing the stone.

According to another feature of the invention, the combination of a ratchet wheel controlled by a pawl and an indexing wheel co-operating with a locking element, said wheels being keyed to the spindle, controls the angular rotation and position of each spindle by locking the same.

The result is that the spindle is rotated without play, thus preventing any possible play and achieving an accurate location of the stone for various operations.

According to the invention, each spindle is formed by a supporting element for the stone to be cut and a driving element each of which have at one of their ends flattened portions so retained against one another without play by a resilient assembling element such that the spindle element which bears the stone rests on a resilient supporting element and move relative to the driving element.

Figure 2:
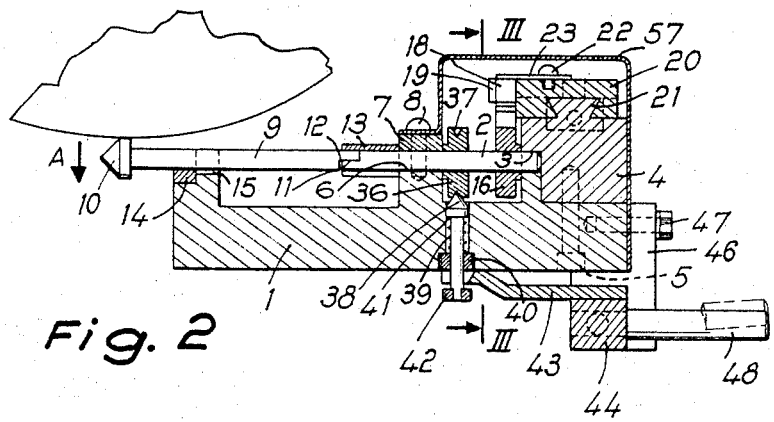
Figure 1:
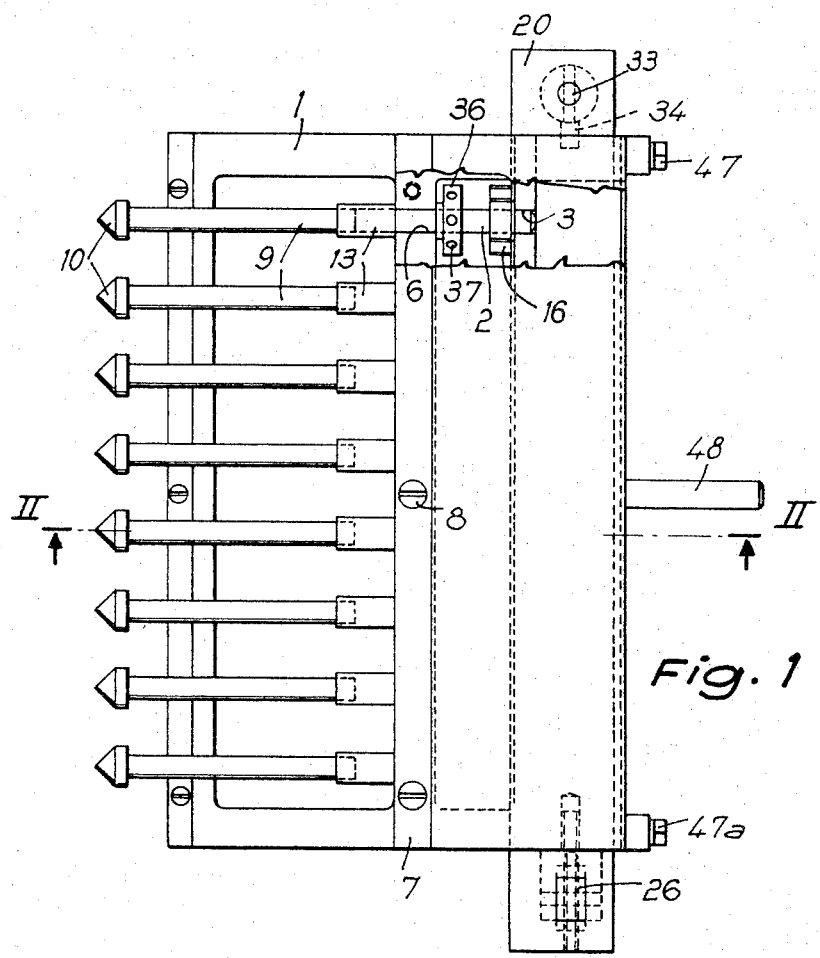
Figure 3:
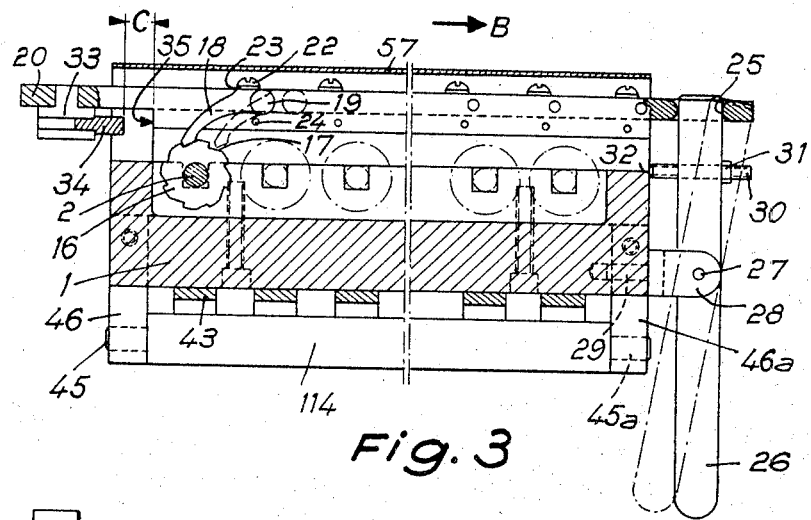
Figure 4:
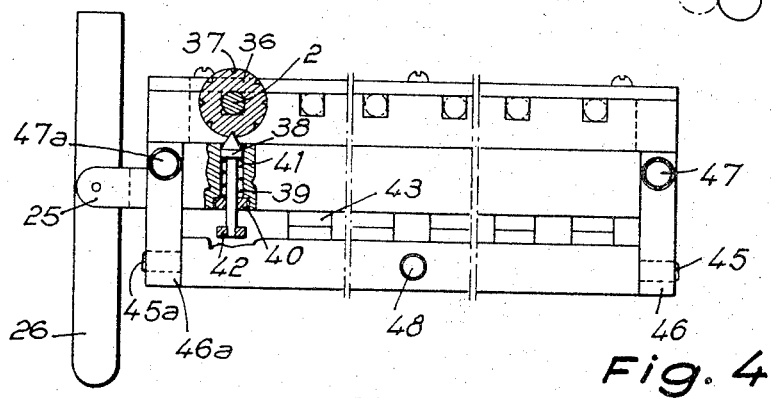
Figure 6:
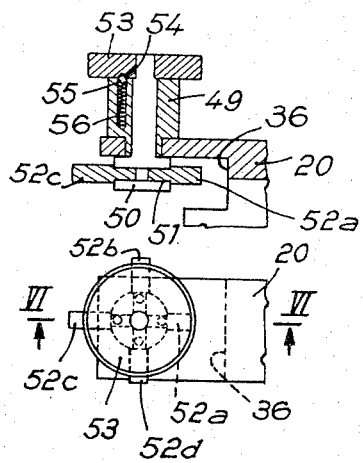
Figure 5:
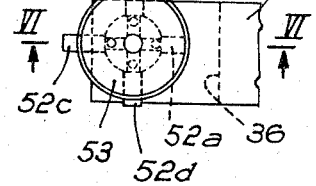

Other advantageous features of the invention will be gathered from the following description of a purely exemplary embodiment of the invention with reference to the accompanying drawings, wherein:

FIG. 1 is a plan view of the stone-carrying device, part of which is cut away to show the two assembled spindle elements and the driving and indexing wheels, FIG. 2 is a view partly in section taken substantially along the line II—II in FIG. 1, through the stone-carrying element according to the invention, FIG. 3 is a view from the left-hand side, sectioned along the line III—III in FIG. 2, FIG. 4 is a view from the right-hand side of the stone-carrying element, the stone-carrying unit being partially cut away to show the indexing wheels in the locked position, FIG. 5 is a plan view of a variant embodiment of the stop-carrying element attached to the slide, and FIG. 6 is a sectional view, taken along the line VI—VI in FIGURE 5, through the stop-carrying element.

Referring to FIGS. 1–4, a stone-carrying element comprises a frame 1 on which are mounted a series of spindles each formed by a driving element 2 and an element 9 which bears a stone 10 to be cut. At one of its ends the spindle-driving element 2 engages in a milled recess 3 which forms a bearing (FIGS. 1 and 2), the element 2 being retained in the recess 3 by a closure element 4 attached to the frame 1 by screws 5. Near its other end, the spindle element 2 engages in a second recess 6 which forms a bearing and is cut into the frame 1, a bar 7 attached by screws 8 retaining the spindle elements 2 in the recesses 6.

At one of its ends the spindle element 2 has a flattened portion 11 which is retained without play against a flattened portion 12 of the spindle element 9 by means of a resilient or elastic member formed by a resilient sleeve 13, the flattened portion 12 of the spindle element 9 being disposed at the opposite end from the stone 10 to be cut.

The resilient joining sleeve 13 is a force fit on the end of the spindle element 2.

Adjacent the stone 10 to be cut the spindle elements 9 bear against a supporting member 14 which is rigid during the roughing-out and cutting operations, but which is replaced by a resilient member for the polishing operation. In the latter case the support 14 is made of a resilient material such as rubber, or it is provided with spring means. The stone 10 may move in the direction indicated by the arrow A (FIG. 1) because of the clearance 15 between the spindle element 9 and the frame 1 and the resiliency of the member 14 during the polishing operation.

In the embodiment of the invention illustrated in the drawings, the spindle, which is formed by two elements 2, 9 could be unitary with the supporting member 14 which is resilient for polishing.

Keyed to each spindle element 2 between the recesses 6, 3, forming bearings, is a ratchet wheel 16. The same is formed with teeth 17—eight in the exemplary embodiment illustrated—which co-operate with pawls 18, the same number of pawls being provided as spindles. Each of the pawls 18 is mounted on a pivot 19 which is a force-fit in a slide 20 moving perpendicularly to the axis of the spindle elements 2. The slide 20 is mounted on an element 4 by dovetail assembling elements 21 which allow the slide 20 to move longitudinally and without play over the element 4.

Attached to the slide 20 by screws 22 are leaf springs 23 which force the pawls 18 into engagement with the teeth 17 of the ratchet wheel 16. A stop element 24 is a force-fit in the slide 20, is disposed below the pawl 18 and limits the movement thereof around the pivot 19.

At one of its ends the slide 20 is formed with an aperture 25 receiving a control lever 26 mounted to pivot around a pivot 27 which is attached to a strap 28 screwed by a screwthreaded nipple 29 into the frame 1.

The lever 26, which is disposed substantially perpendicularly of the slide 20, entrains the latter in the reciprocating movement when it pivots around the pivot 27, assuming the position indicated in chain-dot lines in FIG. 3.

Between its pivot 27 and the slide 20, the lever 26 bears a stop screw 30 having a locking nut 31. The stop screw 30 can bear against face 32 of the frame 1 to limit the full travel of the slide 20.

At its opposite end from the aperture 25 in which the lever 26 engages, the slide 20 bears a supporting element 33 into which a stop element 34 fits which can bear against face 35 of the frame 1 to limit the return travel of the slide 20.

Keyed to each spindle element 2 opposite the ratchet wheel 16 is an indexing wheel 36 whose periphery is formed with the same number of conical recesses 37 as the number of teeth 17 of the ratchet wheel 16. A resilient member formed by a helical spring 39, one end of which abuts a ring 40 screwed into the frame 1 and the other end a shoulder 41 on a locking finger 38 forces the same into the recesses 37. At its other end the finger 38 bears a collar 42 against which bears a fork 43 which acts on the finger 38 against the force of the spring 39.

The forks 43 corresponding to the various spindles are attached to a control rod 44 perpendicular to the spindle axis and pivotably mounted on pivots 45, 45a which rotate in supporting members 46, 46a respectively attached to the frame 1 by screws 47, 47a. In its central portion the rod 44 comprises a control lever 48 which can pivot the bar 44 around the pivots 45, 45a.

The stone-carrying device illustrated in FIGS. 1–4 operates as follows: the lever 26 is pivoted around its pivot 27 from the position shown in continuous lines to the position shown in chain-dot lines. As it pivots, the lever 26, which is unitary with the slide 20, entrains the same in a return movement in the direction indicated by the arrow B, slide travel being limited by the stop 34 which abuts the wall 35 of the frame 1.

During its return movement the slide 20 entrains the pawls 18 which disengage from the teeth 17 of the ratchet wheel 16 to move into the position shown in chain lines in FIG. 3, where they are abutting the element 24. At the same time the lever 48 is raised into the position shown in chain lines in FIG. 2; the lever 26 and the lever 48 can be synchronised in known manner by any suitable automatic or semi-automatic mechanism.

As it rises the lever 48 rotates the rod 44 around its pivots 45, 45a and lowers the forks 43 which act on the collars 42 of the locking finger 38 against the force of the springs 39 to enable the finger 38 to disengage from the recesses 37 in the indexing wheels 36. The fingers 38 being kept out of engagement with the recesses 37 in the indexing wheels 36, the lever 26 is pivoted around its pivot 27 in the opposite direction from the preceding movement, with the result that the slide 20 moves forward in the opposite direction to that indicated by the arrow B. As it advances, the slide 20 entrains the pawls 18 which engage with a tooth 17 of the ratchet wheels 16 and produce a particular angular rotation of the spindle elements 2, 9 and therefore of the stone 10 to be cut. The end of slide travel is determined by the stop screw 30 which abuts the face 32 of the frame 1.

The lever 48 is then lowered back into the position shown in continuous lines in FIG. 2, the forks 43 no longer act on the collar 42, and the locking fingers 38 are forced by the springs 39 back into engagement in the recesses 37 in the indexing wheels 36. The spindle is once more locked, and a cutting operation can be performed on the stone 10.

To make the idea of the invention clearer, the embodiment illustrated in the drawings uses a ratchet wheel 16 having eight teeth and an indexing wheel 36 comprising eight indexing recesses 37 to enable square and octagonal stones to be produced. Of course, the number of teeth and indexing recesses could be 32, 64 or any other number.

FIGS. 5 and 6 show another embodiment of the stop device 33, 34 which enables the spindles to be rotated by different angles if more than eight teeth are used, the travel c of the slide 20 (FIG. 3) being variable. To this end, a bearing 49 fitted to the slide 20 in any suitable manner receives a stop-supporting member 50 which is mounted for rotation in the bearing 49. The supporting member 50 is formed with recesses 51 in which stops 52a, b, c, d are disposed on different lengths which can abut the wall 35 of the frame 1 to determine different amounts of travel of the slide 20.

A manually operated knurled plug 53 keyed to one of the ends of the supporting members 50 and bearing reference marks corresponding to the stops 52a, b, c, d is formed with recesses 54 to enable it to be locked in position by a ball 55 loaded by a spring 56. To protect the mechanism, a casing 57 is attached to the frame 1 by screws 8 which also retain the bar 7.

In other embodiments of the invention, the return travel of the slide 20 can be limited by a stop acting directly on the lever 26. The ratchet wheel 16, the indexing wheel 36 and the spindle 2, which are unitary with one another, could if necessary be cut from the same rod.

Of course, the invention is not limited to the embodiment thereof described hereinbefore and illustrated in the drawings, but covers all variants thereof.

I claim:

1. A gem working machine having a plurality of parallel spindles mounted on a frame; one end of each spindle carrying a stone to be worked; driving means connected to the other end of each spindle for angularly rotating said spindles; each spindle comprising a supporting element for carrying a stone to be worked and a driving element; a single flattened portion formed at one of the ends of each of said supporting and driving elements; elastic assembling elements maintaining said flattened portions of each spindle one against the other without play; and a removable support member, mounted on the frame between the stones to be worked and the elastic assembling elements, for supporting said stone carrying elements.

2. The machine of claim 1 wherein the assembling elements are elastic sleeves surrounding the flattened portions of the spindle elements.

3. The machine of claim 1 further comprising a ratchet wheel keyed to each of said driving elements; a reciprocating slide; pawl means articulately mounted on said slide and cooperating with said ratchet wheels to move said ratchet wheels a fraction of a revolution upon a predetermined movement of the slide; indexing wheels having recesses formed thereon keyed to each of said driving elements; resiliently biased locking fingers cooperating with the recesses of each of said indexing wheels; and fork means controlling each of said locking fingers; the movement of said fork means being so synchronized with that of the slide that the locking fingers are disengaged from the indexing wheels during the angular rotation of the ratchet wheel and move into the locking position at the termination of the rotation.

4. The machine of claim 2 wherein a turret is rotatably mounted on one end of the reciprocating slide; said turret being provided with a series of stops of different lengths which are adapted to cooperate with the frame whereby upon rotation of said turret the return travel of the slide is varied to thereby vary the angular rotation of the spindle.

5. The machine of claim 3 wherein an aperture is formed on the other end of the reciprocating slide; a strap is mounted on the machine frame; a control lever is pivotally mounted in said strap and cooperates with said aperture; and an adjustable stop screw is mounted on said lever to thereby limit the forward travel of the slide.

References Cited

UNITED STATES PATENTS

| | | |
|---|---|---|
| 729,004 | 5/1903 | Starrett. |
| 2,356,184 | 8/1944 | Simons _____ 51—229 X |
| 2,587,172 | 2/1952 | Koebel _____ 51—229 X |

FOREIGN PATENTS 338,247  5/1904  France.

HAROLD D. WHITEHEAD, *Primary Examiner.*